United States Patent [19]

McMahan

[11] Patent Number: 4,970,715

[45] Date of Patent: Nov. 13, 1990

[54] MODEM WITH IMPROVED REMOTE ECHO LOCATION AND CANCELLATION

[75] Inventor: Dennis B. McMahan, Huntsville, Ala.

[73] Assignee: Universal Data Systems, Inc., Huntsville, Ala.

[21] Appl. No.: 333,744

[22] Filed: Apr. 3, 1989

[51] Int. Cl.$^5$ ............................................. H04B 3/23
[52] U.S. Cl. ................................. 370/32.1; 379/410
[58] Field of Search ................. 370/32.1, 32; 379/406, 379/410, 411

[56] References Cited

U.S. PATENT DOCUMENTS

| | | | |
|---|---|---|---|
| 3,535,473 | 10/1970 | Flanagan et al. | 379/410 |
| 3,632,905 | 1/1972 | Thomas et al. | 379/410 |
| 3,721,777 | 3/1973 | Thomas | 379/410 |
| 4,074,086 | 2/1978 | Falconer et al. | 379/398 X |
| 4,394,767 | 7/1983 | Shum | 375/13 |
| 4,481,622 | 11/1984 | Cheng et al. | 370/30 |
| 4,531,220 | 7/1985 | Brie et al. | 375/14 |
| 4,562,312 | 12/1985 | Duttweiler | 370/32.1 |
| 4,571,465 | 2/1986 | Brie et al. | |
| 4,574,166 | 3/1986 | Gritton | 370/32.1 |
| 4,577,309 | 3/1986 | Barazeche et al. | 370/32 |
| 4,582,963 | 4/1986 | Danstrom | 379/411 |
| 4,587,382 | 5/1986 | Yang | 379/410 X |
| 4,613,731 | 9/1986 | Godard | 379/401 |
| 4,645,884 | 2/1987 | Barazeche et al. | 379/406 |
| 4,742,510 | 5/1980 | Quatieri, Jr. et al. | 370/32.1 |

FOREIGN PATENT DOCUMENTS 0137508 4/1985 European Pat. Off. ............ 379/410

OTHER PUBLICATIONS

"A Single-Chip VLSI Echo Canceller", D. L. Duttweiler et al., The Bell System Technical Journal, vol. 59, No. 2, Feb. 1980, pp. 149-160.

Primary Examiner—Jin F. Ng
Assistant Examiner—Randall S. Vaas
Attorney, Agent, or Firm—Charles L. Warren

[57] ABSTRACT

A modem capable of simultaneously transmitting and receiving data signals over a single communication channel with a remote modem includes a transmitter for converting TX digital data into analog signals for transmission over the channel and a receiver for converting received analog signals into RX digital data. A mechanism identifies a remote echo returning to the modem corresponding to previously transmitted TX digital data. The identifiying mechanism is capable of identifiying a echo originating intermediate between the modem and the remote modem. Another mechanism substantially cancels the identified remote echo. The present invention also encompasses the method of identification and cancellation of remote echos. In addition, remote echo cancellation signals are not combined with received signals until local echo has been substantially cancelled.

22 Claims, 2 Drawing Sheets

MODEM WITH IMPROVED REMOTE ECHO LOCATION AND CANCELLATION

This is a continuation of application Ser. No. 07/032,131, filed Mar. 27, 1987, and now abandoned.

BACKGROUND OF THE INVENTION

This invention is generally directed towards the cancellation of echos by a modem using a communication link such as a two wire telephone network. This invention more specifically addresses the problem of identifying and cancelling echos which are remote relative to a modem.

As used herein, an echo refers to the reflected portion of a transmitted signal which returns to the transmitting source or modem because of discontinuities or impedance mismatches in the communications link. Impedance mismatches may typically occur in a telephone system at a 2 wire to 4 wire transformation such as by a hybrid. Such echos represent an undesired or interfering signal to the receiver in the modem.

Echos are normally classified as near-end or far-end echos. A near-end echo is a reflection which normally occurs relatively close in distance and not delayed too long in time relative to the transmitting modem. A far-end echo refers to a reflection which is remote, usually in distance and time, to the transmitting modem and may typically occur near the remote modem.

Determining the exact location (time delay from the origination of the signal to the received corresponding reflection) of a remote echo makes it easier to achieve a high degree of cancellation of the echo. Existing modem systems assume that the most significant remote echo occurs at the remote modem site and uses the time it takes a signal to travel from the local modem to the remote modem and back to the local modem to calculate the time interval to be utilized for remote echo cancellation. This technique has several problems. First, this method requires that the remote modem be active in order to originate a signal to be transmitted back to the local modem. This method also depends upon the consistency in the detection of the signals by the remote modem and the consistency in the transmission of a corresponding signal by the remote modem to the local modem. If an echo originates at other than the remote modem site, this method is completely inadequate in order to determine the location of such an intermediate echo. Because of signal detection variations, this prior method cannot provide the exact location of an echo occurring at the remote modem site; accuracy of plus or minus 4 baud or more is typical for such systems.

SUMMARY OF THE INVENTION

It is an object of the present invention to provide an apparatus and method for more precisely locating remote echos independent of a response from a remote modem.

A further object of the present invention is to provide an apparatus and method for locating intermediate echos which are not related to the transit time between the local and remote modems.

The present invention can be embodied in a modem capable of simultaneously transmitting and receiving data signals over a single communication channel with a remote modem. The modem includes a transmitter for converting TX digital data into analog signals for transmission over the channel and a receiver for converting received analog signals into RX digital data. A means identifies a remote echo returning to the modem corresponding to previously transmitted TX digital data. The identifying means is capable of identifying an echo originating intermediate between the modem and the remote modem. Another means substantially cancels the identified remote echo. The present invention also encompasses the method of identification and cancellation of remote echos.

DETAILED DESCRIPTION

Figure 1:
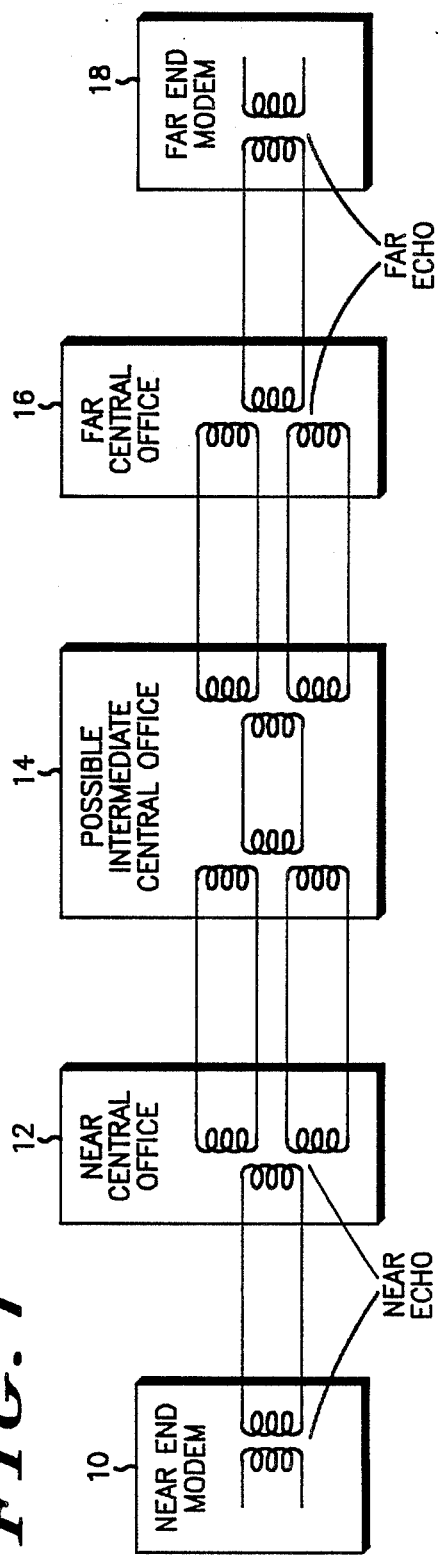
FIG. 1 is a diagram generally illustrating a communication path between an originating modem and a remote modem.

FIG. 1 illustrates a near-end or originating modem 10 connected by a communication link consisting of a near central telephone office 12, intermediate central telephone office 14, and far central telephone office 16 to a far-end or remote modem 18. Modems 10 and 18 may comprise dial-up type modems connected to each other by conventional 2 wire telephone lines. Since the originating modem 10 must receive signals on the same channel on which it transmits signals to the remote modem 18, echos of its own transmitted signal appear as an undesirable, interferring signal to the local modem receiver.

As shown in FIG. 1, a near or local echo may be generated due to an impedance mismatch between the local modem 10 and the central office 12. Based upon typical 2 wire telephone line lengths from a central office, the local echo will likely be received by the originating modem 10 in 0–8 milliseconds (ms) from the actual time the signal was sent by the modem. A far-end echo is also shown in FIG. 1 which occurs due to a mismatch between the far-end modem 18 and central office 16. In a terrestrial communication link a remote echo will typically occur within 0–90 ms. If the communication link includes a one hop satellite link, the remote echo may have an associated delay of approximately 475–675 ms.

Since echos originate due to transmission line mismatch conditions, it will be apparent that an echo could result at intermediate central office 14 or any other intermediate place in the total communication link in which such a mismatch condition occurs. In order to be most effective, the most significant remote echo should be cancelled regardless of whether it originates at an intermediate or remote end site in the communication link. Also the exact location (time delay) of the echo should be determined in order to minimize the complexity of the canceller. The present invention addresses these needs.

Figure 2:
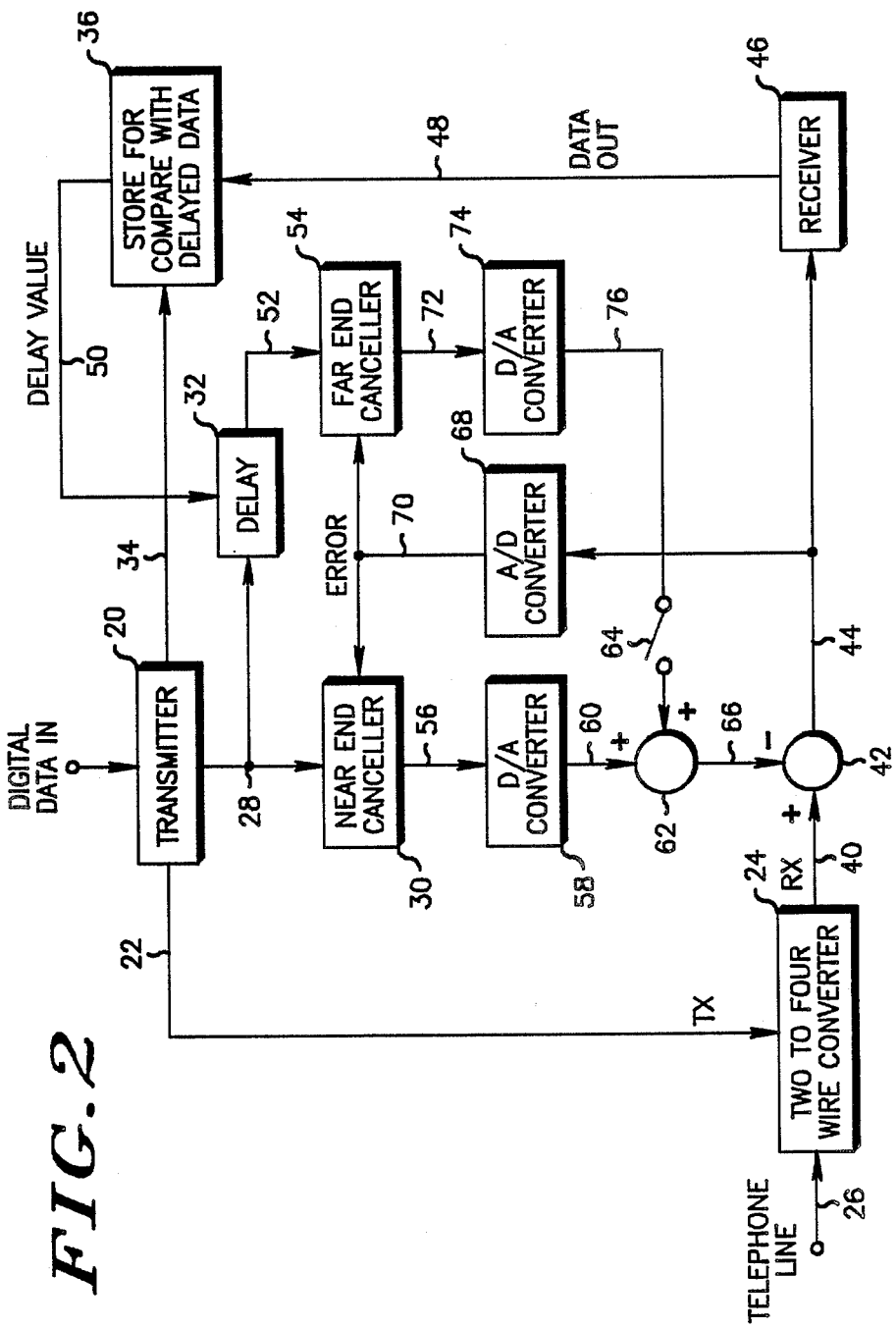
FIG. 2 is a block diagram illustrating an embodiment of the present invention.

FIG. 2 illustrates a modem which incorporates an embodiment of the present invention. A modem transmitter 20 receives digital data such as from data terminal equipment and provides modulated analog signals on line 22 to a 2 to 4 wire converter or hybrid 24 which couples these signals to a 2 wire telephone line 26. A typical transmitter may include a scrambler, a phase encoder and a digital to analog (D/A) converter for generating the transmitter output signals. In the illustrative embodiment the digital data is encoded and transmitted at the rate of 2 bits/baud. The following Table 1 illustrates the four possible baud combinations for carrying the two bits.

TABLE 1

| 01 | 00 |
|---|---|
| 11 | 10 |

The output 28 of transmitter 20 consists of the scrambled digital baud information which is coupled to near-end canceller 30 and variable delay element 32. Output 34 from transmitter 20 consists of scrambled digital baud information grouped into digital words consisting of 4 bauds or 8 bits per word. These digital words are stored in storage and comparison element 36.

Received signals (RX) including echos on telephone line 26 are coupled by converter 24 to receiver input line 40 which is coupled to one input of a summer 42. The output 44 of summer 42 is coupled to a conventional modem receiver 46. Such a modem receiver may consist of an analog to digital (A/D) converter, a digital filter, and an adaptive equalizer. The recovered and equalized digital baud information is grouped into digital words of 4 bauds or 8 bits each and coupled by line 48 to block 36.

As will be explained in greater detail below, the received digital words are compared by store and compare element 36 to the stored transmit data in order to locate the remote echo. The output of element 36 carried by line 50 to delay function 32 consists of digital information representative of the time delay of the remote echo. The output of delay element 32 on line 52 which is coupled to far-end canceller 54 consists of the input on line 28 delayed in time by a time interval determined by the digital information contained on line 50.

Cancellation of a near echo will preferably precede the cancellation of a remote echo. The digital output of a conventional near-end canceller 30 is coupled by line 56 to a D/A converter 58 which provides an analog output on line 60 to summer 62. Switch 64 is preferably open during the near-end cancellation so that summer 62 does not receive another input. The output of summer 62 on line 66 is summed by summer 42 with the analog received signal coupled by line 40. The summation process by summer 42 is actually a subtraction so that two identical analog signals would cancel. The output on line 44 from summer 42 provides an input to A/D converter 68. The output of converter 68 comprises a digital error signal coupled by line 70 to near-end canceller 30 and far-end canceller 54. This error signal constitutes the feedback signal which allows the near-end canceller 30, and the far-end canceller 54, when active, to converge and thereby cancel the corresponding echo. The receiver 46 is preferably OFF during the near-end cancellation.

Following the convergence of near-end canceller 30 and the corresponding cancellation of the near-end echo signal, switch 64 is closed and receiver 46 is turned ON or made operational. The digital output on line 28 from transmitter 20 is coupled to far-end canceller 54 after being delayed by delay element 32. The digital error signal carried by line 70 provides the other input to a conventional canceller 54. Although the near-end canceller 30 reduced the total error signal by cancelling the near-end echo portion, the remote echo (and other undesirable signals) are still present at the output of summer 42 and provide an error signal coupled to far-end canceller 54. The digital output of canceller 54 is coupled by line 72 to D/A converter 74 whose output is coupled by line 76 to switch 64 which is closed during far-end cancellation. Thus the analog output from canceller 54 is summed with the analog output from near-end canceller 30 and coupled by line 66 to summer 42. When correlation between the received digital words and the stored data has been achieved, the output from element 36 provides the correct delay by element 32 so that far-end canceller 54 can converge on the far-end or remote echo. After the far-end canceller 54 has converged, its output will cause substantial cancellation of the far echo by the subtraction occurring at summer 42. Thus, the error signal coupled by line 44 via A/D converter 68 and line 70 to the cancellers will decrease further representing cancellation of both a near-end echo and a remote echo. The error signal may not become zero due to other more minor echos or undesired interfering signals which may be present on the received signal coupled by line 40 to summer 42. It will be apparent to those skilled in the art that the outputs of cancellers 30 and 54 are cancellation data derived by appropriately shaping the input data pursuant to the error data on line 70 as is conventional in canceller operation.

The transmitter 20 preferably generates a pseudo-random data training sequence during the convergence of the near and remote end cancellers. During this training period the remote modem does not transmit any signals which would make it more difficult for the local modem to converge on the echos. Thus, it should be apparent that the remote modem does not contribute to the location of the remote echo to be cancelled by the originating modem. It should also be apparent that the remote echo cancellation accomplished by the originating modem will converge on the most dominant remote echo which could be due to an intermediate as well as a remote end reflection of the transmitted signal.

Although a modem incorporating an embodiment of the present invention is illustrated as a block diagram in FIG. 2, it will be apparent to those having skill in this art that most of the required functions can be accomplished in software as well as a hardware implementation. For example, the near-end canceller 30 and the far-end canceller 54 could comprise a software implementation of an FIR filter in which the filter coefficients are changed in response to the error signal. Also, the received signals from converter 24 could be converted to digital signals by an A/D converter prior to summer 42. In such an embodiment, D/A converters 58 and 74, and A/D converter 68 would be eliminated with the cancellation occurring directly on the digital received data.

The preferred implementation of store and compare element 36 and delay element 32 is in software utilizing a microprocessor with an appropriate amount of RAM utilized for the storage and delay functions. In the preferred implementation, digital words input on line 34 are stored in a contiguous area of RAM formatted as 8 bit words each consisting of 4 baud. Receiver 46 outputs 8 bit words on line 48 representing 4 baud. The receiver output bytes are updated for each new received baud and are compared with the stored data which corresponds to previously transmitted baud in order to find the time delay associated with the remote echo.

In order to find a correlation between the stored transmitted words and the received words, a receiver output word could be sequentially compared baud by baud against all the stored transmitter words until a match or correlation is found. However, in conventional telephone systems the delay of the echo is normally determined by the type of communication link, i.e., terrestial only links or a link including a satellite hop. It has been determined that for a terrestrial link, remote echos will occur within approximately 90 ms. In a communication link including a satellite hop remote echos will normally occur within a range of approximately 475–675 ms.

Figure 3:
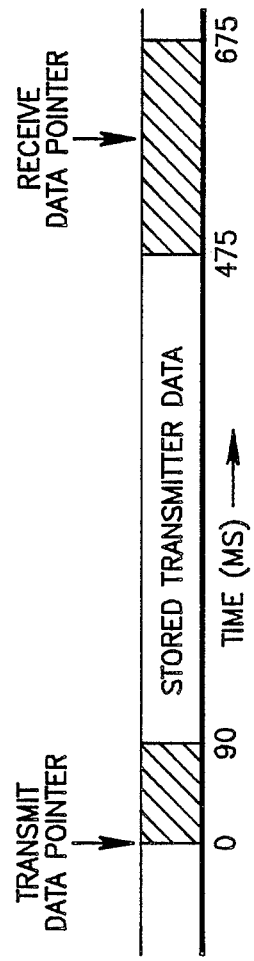
FIG. 3 illustrates location of the echo time delay relative to storing previously transmitted, data.

Referring to FIG. 3, the transmitted data which is preferably stored in RAM is illustrated as a continuous band representing a plurality of stored transmitted data bauds. A representative time scale is shown in milliseconds. A transmit software pointer is illustrated at the zero, i.e. the current data baud being transmitted. A receive software pointer is shown located in the 475–675 ms time window and represents the relative location where comparisons are being made.

The number of bits or baud between the transmit pointer and the receive pointer, when correlation has been established, determines the time delay of the echo. An area of RAM is allocated sufficient in size to accommodate the longest possible echo delay anticipated. The stored transmitted data information in this RAM area is continually updated. Since the distance between the transmit and receive pointers is known in terms of bytes and the rate at which data is being transmitted is known, the time delay of the echo could be calculated. However, the actual baud displacement is available and can be directly used as the delay value.

When a match is found between a received byte to a stored transmitted byte, correlation may or may not have been determined. Further verification is desirable. Since each byte corresponds to 4 baud, the next received byte compared to the stored transmitted byte will represent 4 baud later. After a match between a received data byte and a stored transmitted byte is found and after 4 baud has elapsed, the next received byte is ready for comparison to the next transmitted byte.

The received and stored transmitted bytes are compared by exclusively OR'ing the received byte with the corresponding transmitted byte as stored in RAM. In the word resulting from the comparison, each bit will be a 0 where correlation occurred and a 1 where there was no bit correlation. Table 2 illustrates six examples of such comparisons.

TABLE 2

| Example | Baud # Bits | 4 76 | 3 54 | 2 32 | 1 10 | |
|---|---|---|---|---|---|---|
| 1 | | 00 | 00 | 00 | 00 | No Errors |
| 2 | | 01 | 10 | 00 | 00 | 2 Consecutive Baud Errors |
| 3 | | 00 | 10 | 01 | 00 | |
| 4 | | 00 | 00 | 01 | 01 | |
| 5 | | 00 | 10 | 00 | 01 | 2 Non-Consecutive Baud Errors |
| 6 | | 00 | 00 | 11 | 00 | 2 Errors in 1 Baud |

In example 1, no errors occurred, i.e., a perfect match resulted. In examples 2–4, two consecutive baud errors occurred in which only one error occurred in each baud. That is, each error consisted of a 01 or 10, not a 11. Because of the transmitted data structure and quadrature orientation as shown in Table 1, baud errors will normally occur in consecutive pairs of bauds where correlation between the received and transmitted data exist. Example 5 illustrates 2 non-consecutive baud errors. Example 6 illustrates a double error in baud 2 in which both bits did not match, i.e., a 11 resulted.

Once correlation is established, certain errors are tolerated before it is determined that correlation no longer exists. Examples 1–4 illustrate comparisons in which correlation is still assumed to exist. Examples 5 and 6 illustrate error conditions which are interpreted as representing a lack of correlation. Thus, any byte in which 2 errors exist in one baud or 2 non-consecutive baud errors occur require a new echo location be sought. That is, the receive pointer relative to the transmit pointer will be shifted in order to seek correlation between the received bytes and the stored transmitted bytes at a new time interval. As soon as 4 consecutive bytes meet the above criteria, synchronization is assumed and the corresponding delay is provided by delay element 32.

The echo delay is computed as follows:

$$\text{DELAY} = ((RX \text{ POINTER} - TX \text{ POINTER}) \times 4) + \text{PARTIAL BYTES} + \text{DELAY OF RECEIVER}$$

The difference in time between the receive and transmit pointer is multiplied by 4 since there are 4 bauds per byte. The partial bytes take into account that less than a full byte (4 baud) may have been transmitted, and allows 1, 2, or 3 baud which have been transmitted to be accounted for even though a complete byte had not been formed. The delay of the receiver refers to the inherit time delay associated with processing incoming data signals by receiver 46 before output data is transmitted on line 48. The delay of the receiver is basically a constant delay time which is converted into an equivalent number of baud and used in the equation.

Although an embodiment of the present invention has been illustrated and described, the scope of the invention is defined by the following claims.

I claim:

1. In a modem capable of simultaneously transmitting and receiving data signals over a single communication channel with a remote modem, the modem including a transmitter for converting TX digital data into analog signals for transmission over the channel and a receiver for converting received analog signals into RX digital data, the improvement comprising:

means for identifying and substantially cancelling a remote echo returning to the modem corresponding to previously transmitted TX digital data, said identifying and cancelling means means being capable of identifying an echo originating intermediate between the modem and the remote modem and generating a remote echo cancellation signal;

means for identifying and substantially cancelling a local echo returning to the modem corresponding to previously transmitted TX digital data, said local echo having a time delay less than the time delay of said remote echo;

means for adding said remote echo cancellation signal to said received signals; and means for inhibiting said remote echo cancellation signal from being added to said received signals until said local echo identifying and cancelling means has substantially cancelled said local echo.

2. The modem according to claim 1 wherein said identifying means comprises means for storing previously transmitted TX data and means for determining the time delay associated with said identified remote echo, said time determining means comprising means for comparing received RX data with said stored TX data until a valid match is found, the number of stored data between said valid match and the TX data currently being transmitted defining the time delay of said echo.

3. The modem according to claim 2 wherein said cancelling means comprises means for subtracting from the received data cancellation data derived from the stored TX data corresponding to said time delay of the echo so as to substantially cancel said echo.

4. The modem according to claim 1 wherein said identifying means identifies only those remote echos having a time delay within a predetermined time interval.

5. The modem according to claim 1 wherein said identifying means identifies only those echos having a time delay within at least two predetermined non-contiguous time intervals 6. The modem according to claim 1 wherein said identifying means identifies remote echos independent of the remote modem.

7. An echo cancellation method for a modem capable of simultaneously transmitting and receiving data signals over a single communication channel with a remote modem, the modem including a transmitter for converting TX digital data into analog signals for transmission over the channel and a receiver for converting received analog signals into RX digital data, the method comprising the steps of:
identifying and substantially cancelling a remote echo returning to the modem corresponding to previously transmitted TX digital data, said identifying and cancelling step including the capability of identifying an echo originating intermediate between the modem and the remote modem and generating a remote echo cancellation signal;
identifying and substantially cancelling a local echo returning to the modem corresponding to previously transmitted TX data, said local echo having a time delay less than the time delay associated with said remote echo;
adding said remote echo cancellation signal to said received signals; and
inhibiting said remote echo cancellation signal from being added to said received signals until said local echo has been substantially cancelled.

8. The method according to claim 7 wherein said step of identifying said remote echos includes the steps of storing previously transmitted TX data and determining the time delay associated with said identified remote echo, said step of determining the time delay comprising the step of comparing the received RX data with said stored TX data until a valid match is found, the number of stored data between said valid match and said TX data currently being transmitted defining the time delay of said remote echo.

9. The method according to claim 8 wherein said remote echo cancelling step comprises the step of subtracting from the received data cancellation data derived from the stored TX data corresponding to said time delay of the echo so as to substantially cancel said remote echo.

10. The method according to claim 7 wherein only those remote echos having a time delay within a predetermined time interval are identified.

11. The method according to claim 7 wherein only those echos having a time delay within at least two predetermined non-contiguous time intervals are identified.

12. The method according to claim 7 wherein said identifying of a remote echo is independent of the remote modem.

13. A modem with improved echo cancellation for operation over a communication link with another modem comprising:
means for transmitting TX data over said link;
means for receiving signals sent over said link including echoes of said TX data;
means for identifying a received remote echo independent of the other modem, said identifying means comprising means for storing previously transmitted TX data and means for determining the time delay associated with said identified remove echo, said time determining means comprising means for comparing received RX data with said stored TX data until a valid match is found, the number of stored data between said valid match and the TX data currently being transmitted defining the time delay of said echo;
means for substantially cancelling said remote echo; and
means for identifying and substantially cancelling a local echo returning to the modem corresponding to previously transmitted TX digital data, said local echo having a time delay less than the time delay of said remote echo,
said remote echo cancelling means comprising means for adding a remote echo cancellation signal to said received signals, and means for inhibiting said remote echo cancellation signal from being added to said received signals until said local echo has been substantially cancelled.

14. The modem according to claim 13 wherein said cancelling means comprises means for subtracting from the received data cancellation data derived from the stored TX data corresponding to said time delay of the echo so as to substantially cancel said echo.

15. The modem according to claim 13 wherein said identifying means identifies only those remote echos having a time delay within a predetermined time interval.

16. The modem according to claim 13 wherein said identifying means identifies only those echos having a time delay within at least two predetermined non-contiguous time intervals.

17. The modem according to claim 13 wherein said identifying means is capable of identifying an echo originating intermediate of said modem and the another modem.

18. A method for improving echo cancellation in a communication link comprising the steps of:
transmitting TX data over said link from a first device;
receiving signals sent over said link including echoes of said TX data;
identifying a received remote echo independent of any devices remote from said first device, said identifying step including storing previously transmitted TX data and determining the time delay associated with said identified remote echo, said step of determining the time delay comprising the step of comparing the received RX data with said stored TX data until a valid match is found, the number of stored data between said valid match and said TX data currently being transmitted defining the time delay of said remote echo;
substantially cancelling said remote echo; and
identifying and substantially cancelling a local echo returning to the modem corresponding to previously transmitted TX data, said local echo having a time delay less than the time delay associated with said remote echo,
said remote echo cancelling comprising the steps of adding a remote echo cancellation signal to said received signals and inhibiting the adding of said remote echo cancellation signal to said received signals until said local echo has been substantially cancelled.

19. The method according to claim 18 wherein said cancelling step comprises the step of subtracting from the received data cancellation data derived from the stored TX data corresponding to said time delay of the echo so as to substantially cancel said remote echo.

20. The method according to claim 18 wherein only those remote echos having a time delay within a predetermined time interval are identified.

21. The method according to claim 18 wherein only those echos having a time delay within at least two predetermined non-contiguous time intervals are identified.

22. The method according to claim 18 wherein said identifying of a remote echo includes the capability of identifying an echo originating intermediate of said modem and the another modem.

* * * * *

UNITED STATES PATENT AND TRADEMARK OFFICE
CERTIFICATE OF CORRECTION

PATENT NO.   :   4,970,715
DATED        :   Nov. 13, 1990
INVENTOR(S)  :   Dennis B. McMahan It is certified that error appears in the above-identified patent and that said Letters Patent is hereby corrected as shown below:

claim 13, column 8, line 16, delete "remove" and
insert therefor --remote--.

Signed and Sealed this

Twenty-eighth Day of July, 1992

Attest:

DOUGLAS B. COMER

Attesting Officer    Acting Commissioner of Patents and Trademarks

UNITED STATES PATENT AND TRADEMARK OFFICE
CERTIFICATE OF CORRECTION

PATENT NO. : 4,970,715
DATED : Nov. 13, 1990
INVENTOR(S) : Dennis B. McMahan

It is certified that error appears in the above-identified patent and that said Letters Patent is hereby corrected as shown below:

On title page, item [63], insert after "(22) Filed: Apr. 3, 1989"
--Related U.S. Application Data: Continuation of Ser. No. 07/032,131, filed March 27, 1987, now abandoned--

Signed and Sealed this

Fifth Day of October, 1993

Attest:

Attesting Officer

BRUCE LEHMAN

Commissioner of Patents and Trademarks